(12) United States Patent
Knapp

(10) Patent No.: US 10,304,095 B2
(45) Date of Patent: May 28, 2019

(54) SYSTEM AND METHOD FOR ACCOUNTING GATEWAY

(75) Inventor: Kathie Knapp, Dexter, MI (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 1475 days.

(21) Appl. No.: 12/012,581

(22) Filed: Feb. 4, 2008

(65) Prior Publication Data

US 2009/0276340 A1 Nov. 5, 2009

(51) Int. Cl.
*G06Q 30/04* (2012.01)
*G06Q 40/00* (2012.01)

(52) U.S. Cl.
CPC ............ *G06Q 30/04* (2013.01); *G06Q 40/12* (2013.12)

(58) Field of Classification Search
CPC ........ G06Q 30/04; G06Q 20/10; G06Q 40/10; G06Q 40/02; G06Q 40/00
USPC ............................................................. 705/30
See application file for complete search history.

(56) References Cited

U.S. PATENT DOCUMENTS

| | | | | | |
|---|---|---|---|---|---|
| 5,173,853 | A * | 12/1992 | Kelly | ............. | G06F 17/2205 715/235 |
| 5,794,234 | A * | 8/1998 | Church | ............. | G06F 17/2264 |
| 5,893,131 | A * | 4/1999 | Kornfeld | ............. | G06F 16/245 715/236 |
| 6,185,576 | B1 * | 2/2001 | McIntosh | ............. | G06F 16/30 |
| 6,397,232 | B1 * | 5/2002 | Cheng-Hung | ......... | G06F 16/258 715/203 |
| 6,405,251 | B1 * | 6/2002 | Bullard | ............. | G06Q 30/04 709/224 |
| 6,697,787 | B1 * | 2/2004 | Miller | ............. | 705/31 |
| 6,850,950 | B1 * | 2/2005 | Clarke | ............. | G06F 17/272 |
| 6,954,766 | B2 * | 10/2005 | Ouchi | ............. | G06Q 10/06 |
| 7,120,597 | B1 * | 10/2006 | Knudtzon | ............. | G06Q 40/02 705/30 |
| 7,433,878 | B2 * | 10/2008 | Mika | ............. | G06Q 40/00 |
| 7,451,103 | B1 * | 11/2008 | Boyle | ............. | G06Q 20/10 705/35 |
| 7,539,701 | B2 * | 5/2009 | Sethi | ............. | G06F 16/214 |
| 7,725,817 | B2 * | 5/2010 | Krasun | ............. | G06F 16/81 715/236 |
| 7,885,868 | B2 * | 2/2011 | Nault | ............. | G06Q 40/02 705/30 |
| 7,895,094 | B2 * | 2/2011 | Tandon | ............. | G06Q 20/10 705/30 |
| 8,255,790 | B2 * | 8/2012 | Francker | ............. | G06F 8/36 715/221 |

(Continued)

*Primary Examiner* — Ashford S Hayles
(74) *Attorney, Agent, or Firm* — Duncan Galloway Egan Greenwald, PLLC; Kevin T. Duncan

(57) ABSTRACT

The present invention provides an accounting gateway for facilitating and effecting translation and efficient data transfer between an accounting system and a plurality of client systems operating a variety of external bookkeeping solutions. The gateway brokers data exchanges between an accounting firm and its clients by translating data records associated with a client bookkeeping solution and in an external format into a format for use by an accounting software at the accounting system, such as for generating reports, financial statements and other processes and uses. An accounting system communicates with one or more client systems via a communications link to import, export or access data records between the entities to enhance provision of professional services.

30 Claims, 6 Drawing Sheets

(56) References Cited

U.S. PATENT DOCUMENTS

| | | | | |
|---|---|---|---|---|
| 8,751,464 B1* | 6/2014 | Weiss | G06Q 10/10 | 707/695 |
| 9,009,098 B1* | 4/2015 | Hushon | G06F 16/27 | 707/602 |
| 9,508,087 B1* | 11/2016 | Liu | G06Q 30/0251 | |
| 2002/0052791 A1* | 5/2002 | Defede | G06Q 20/20 | 705/16 |
| 2002/0052893 A1* | 5/2002 | Grobler | G06F 16/258 | 715/234 |
| 2002/0138375 A1* | 9/2002 | Kane | G06Q 40/02 | 705/30 |
| 2003/0005426 A1* | 1/2003 | Scholtens | G06F 8/656 | 717/169 |
| 2003/0126056 A1* | 7/2003 | Hausman | G06Q 10/10 | 705/36 R |
| 2003/0216979 A1* | 11/2003 | Sribhibhadh | G06Q 10/06 | 705/30 |
| 2003/0225638 A1* | 12/2003 | Secola | | 705/30 |
| 2004/0068526 A1* | 4/2004 | Singh | G06F 16/258 | |
| 2004/0143522 A1* | 7/2004 | Wall | G06Q 30/04 | 705/34 |
| 2004/0181753 A1* | 9/2004 | Michaelides | G06F 16/258 | 715/249 |
| 2004/0205621 A1* | 10/2004 | Johnson | G06F 17/211 | 715/235 |
| 2004/0205647 A1* | 10/2004 | Smith | G06F 17/2247 | 715/229 |
| 2005/0022154 A1* | 1/2005 | Chung | G06Q 10/10 | 717/100 |
| 2005/0055324 A1* | 3/2005 | Godeby | G06Q 40/12 | |
| 2005/0144096 A1* | 6/2005 | Caramanna, II | G06Q 40/06 | 705/30 |
| 2005/0154628 A1* | 7/2005 | Eckart | G06Q 30/02 | 705/35 |
| 2005/0197931 A1* | 9/2005 | Gupta | G06Q 40/00 | 705/30 |
| 2005/0216497 A1* | 9/2005 | Kruse | G06Q 10/00 | |
| 2005/0240467 A1* | 10/2005 | Eckart | G06Q 10/10 | 705/30 |
| 2006/0004845 A1* | 1/2006 | Kristiansen | G06F 8/38 | |
| 2007/0078877 A1* | 4/2007 | Ungar | G06F 17/2247 | |
| 2007/0150385 A1* | 6/2007 | Ode | G06Q 20/04 | 705/30 |
| 2007/0150806 A1* | 6/2007 | Hartmann | G06F 17/2247 | 715/235 |
| 2007/0174482 A1* | 7/2007 | Yajima | G06F 17/243 | 709/238 |
| 2007/0237427 A1* | 10/2007 | Patel | G06K 9/00442 | 382/305 |
| 2007/0260571 A1* | 11/2007 | Mansfield | G06F 17/227 | 706/48 |
| 2007/0277090 A1* | 11/2007 | Raja | G06F 17/2211 | 715/212 |
| 2008/0201246 A1* | 8/2008 | Casey | G06Q 40/00 | 705/30 |
| 2008/0250157 A1* | 10/2008 | Ohata | G06Q 10/10 | 709/236 |
| 2008/0306986 A1* | 12/2008 | Doyle, Sr. | G06F 8/51 | |
| 2009/0037356 A1* | 2/2009 | Rothstein | G06Q 30/08 | 706/46 |
| 2009/0150223 A1* | 6/2009 | Sachedina | G06Q 10/06 | 705/7.24 |
| 2009/0187496 A1* | 7/2009 | Edens | G06Q 10/06 | 705/30 |
| 2009/0204517 A1* | 8/2009 | Edens | G06Q 10/06 | 705/30 |
| 2009/0222470 A1* | 9/2009 | Kemp | G06F 16/283 | |
| 2009/0276340 A1* | 11/2009 | Knapp | G06Q 30/04 | 705/30 |
| 2010/0057783 A1* | 3/2010 | Huang | G06F 16/258 | 707/E17.005 |
| 2010/0125616 A1* | 5/2010 | Groth | G06Q 10/10 | 707/804 |
| 2010/0179940 A1* | 7/2010 | Gilder | G06F 16/258 | 707/622 |
| 2010/0205076 A1* | 8/2010 | Parson | G06Q 40/02 | 705/30 |
| 2010/0318572 A1* | 12/2010 | Ng | G06F 16/283 | 707/791 |
| 2011/0173294 A1* | 7/2011 | Jackson | H04L 12/14 | 709/217 |
| 2011/0258091 A1* | 10/2011 | Wilson | G06Q 40/02 | 705/30 |
| 2012/0011123 A1* | 1/2012 | Nagel | G06Q 10/10 | 707/738 |
| 2012/0095873 A1* | 4/2012 | Narang | G06Q 30/0613 | 705/26.41 |
| 2012/0203676 A1* | 8/2012 | Chou | G06Q 40/02 | 705/30 |
| 2012/0259872 A1* | 10/2012 | Sengupta | G06Q 10/06 | 707/756 |
| 2012/0265655 A1* | 10/2012 | Stroh | G06Q 40/00 | 705/30 |
| 2013/0046661 A1* | 2/2013 | Levin | G06Q 40/02 | 705/30 |
| 2013/0173539 A1* | 7/2013 | Gilder | G06F 16/273 | 707/622 |
| 2013/0191328 A1* | 7/2013 | Hackmann | G06F 16/258 | 707/609 |
| 2013/0232042 A1* | 9/2013 | Simpson | G06Q 40/02 | 705/30 |
| 2013/0265592 A1* | 10/2013 | Bellagamba | G06Q 30/0276 | 358/1.6 |
| 2013/0290837 A1* | 10/2013 | Hudetz | G06F 17/212 | 715/255 |
| 2014/0006244 A1* | 1/2014 | Crowley | G06Q 40/04 | 705/37 |
| 2014/0013204 A1* | 1/2014 | Theis | G06F 17/24 | 715/234 |
| 2014/0101456 A1* | 4/2014 | Meunier | G06F 17/2247 | 713/189 |
| 2014/0136398 A1* | 5/2014 | Nagel | G06Q 40/02 | 705/39 |
| 2014/0250368 A1* | 9/2014 | Wineman | G06F 17/211 | 715/235 |

\* cited by examiner

FIGURE 5

SYSTEM AND METHOD FOR ACCOUNTING GATEWAY

BACKGROUND OF THE INVENTION (a) Field of the Invention

The present invention relates to software and systems for use in financial accounting and associated bookkeeping solutions, including for use in preparing financial statements. More particularly, the present invention provides a system and method for handling data transfer to and from client and service provider and brokering interactions, such as between an accounting firm and its clients.

(b) Background of the Invention

As companies continue to strive for efficiency, consistency and flexibility, computers and software executed on computers are increasingly relied upon to automate, semi-automate, enhance, quicken and make reliable and uniform business processes. This is true even in fields of professional service providers, such as accountants and other financial professionals, and fields in which standardized procedures and documents govern acceptable and "best" practices.

To help accounting professionals, such as accounting firms, provide and manage accounting related professional services to clients, such as corporations, companies, such as The Thomson Corporation (Thomson), have developed, marketed and sold software products and services, such as the Thomson CS Professional Suite of software products. With some of these products, the accounting firm uses the professional software on its computer system (the "accountants system") and provides one or more of its clients with a client-side solution that operates on its clients' computer system (the "client system") that may be set-up to fit the clients' particular needs and situation.

There currently exist solutions available and marketed to professionals and to their clients that provide bookkeeping, accounting and other financial services. For instance, Thomson's CS Professional Suite of accounting products provide tools and solutions for accountants, accounting firms (accountant systems) and their clients (client systems). For instance, Thomson's Client Bookkeeping Solution ("CBS") is a client accounting software solution used in maintaining a company's financial or accounting records or "books." CBS is a fully functional checkwriting and bookkeeping software for use by both accountants and their clients. CBS may be customized by accounting firms to streamline clients' day-to-day bookkeeping tasks and to provide functional capabilities best suited for clients' needs. Using CBS, accountants may import client data from client bookkeeping solutions, such as QuickBooks Pro®/Premier/Enterprise, Peachtree®, Microsoft Office Accounting®, Paychex, and BusinessWorks® formats, directly into accounting write-up software, for example Thomson's Write-Up CS product. Write-Up CS enables accountants to provide customized accounting services that efficiently meet their clients' needs, including providing analytical services, standard and custom reports, and financial statements. Write-Up CS transforms high-level financial data using its Report and Financial Statement Editor to generate reports and financial statements. Client transaction data may be transferred directly into the accountants' Write-Up CS™ software solution to produce reports and financial statements without having to reenter data. Other products, such as Thomson's Trial Balance CS™, Payroll CS™, Ultra Tax CS™, and Engagement CS™ applications, may be used to perform further functionality, for example, data sorting and presentation, payroll related processing, customizable financial statements, engagement workflow and document management, and tax return preparation and filing.

With CBS, an accounting firm may provide clients with CBS software, such as by CD or over the Internet using ASP technology (CBS ASP) via NetClient CS™ portals. CBS clients may be set up using information from the accountant's Write-Up CS™ software. The accountant's client may use CBS to, among other things, record and print checks, record transactions, and generate reports. Periodically, clients transmit to the accounting firm transaction details, such as via email, web portal, or on disk, whereupon data is complete and organized for transfer to the accountant's Write-Up CS software solution, for example.

In the field of accounting software architectures, the available prior art fails to provide a bi-directional exchange of data between accounting databases to external client bookkeeping systems (also referred to as client accounting systems) involving data of different, external formats. A need exists for accounting service providers to seamlessly and automatically receive and translate client data from clients and to translate and transmit data back to client systems. Further, a need exists to facilitate clients' retaining of records of their financial details in electronic forms for many purposes, including accounting and evaluation purposes. Existing systems may interact in a one-direction data transfer or in a data exchange across common formats, but fail to provide a data exchange capable of both importing and exporting financial data across multiple and varied formats. Furthermore, the software architecture currently employed in the industry fails to provide a single interface through which the financial record products of multiple platforms can be received, automatically processed in an accounting system, read and edited, and returned to a client.

SUMMARY OF THE INVENTION

In accordance with the present invention, an interface or gateway between service provider (accounting firm) and client is provided ("accountant gateway") that effectively receives and translates client data from a plurality of clients. The client data resides at each of the respective client systems and is in various formats, including external formats, i.e., formats that do not use the same schema as the accountant system formatting. For instance, in the case of the Thomson suite of solutions, the accountant gateway receives client data, including external or non-common formats, into an accountant write-up solution, for example Thomson's Write-Up CS™. Once translated and loaded into the accountant-side solution, the client data, such as client-side bookkeeping data may be reviewed for accuracy and notes may be attached by the client. Also, once the client data is translated and loaded, the accountant-side system may be used to produce trial balance and generate financial statements, payroll compliance, and other reports. The client may interact with data stored and software accessible on the accountant system such as a client-server arrangement. In this manner day-to-day record keeping and check writing is largely automated. CBS provides an ongoing snapshot of cash flow.

The present invention addresses the shortcomings of the prior art and provides, among other things, a communication channel between accounting service providers, such as accountants and accounting firms, and their clients for importation, review and modification and exportation of financial records, as well as generation of reports and other work product.

The present invention provides a software-based system for interfacing between the computer system and database of an accounting firm and the computer systems of clients of the accounting firm. The system architecture provides bi-directional import and export of data between an accounting service provider and its clients allowing the accounting firm to securely import financial records from its clients. The system includes a gateway through which client-side data from client-side bookkeeping solutions may be imported and translated and automatically formatted and loaded into the accountant system and database for further use in providing services to the clients.

The accounting firm may import financial records of various formats from client-side bookkeeping software applications, e.g., CBS, QuickBooks, Peachtree, Microsoft Office Accounting, Paychex, and BusinessWorks formats, into the accounting system. The form in which the financial records are imported may be, for example, in data-file form. The present invention provides automated importation and translation and viewing and editing of documents maintained by the client system in various formats. The present invention allows the accounting firm to receive, review, and make changes on behalf of their clients to the financial records and other client data. This benefit is particularly useful in cleaning up client-side errors and miscalculations when creating or editing financial records. One role of an accounting firm and goal of associated software is to help ensure that client records are accurately maintained. The present invention facilitates importing, translating, handling, and accurate maintenance of such financial records and client data.

The present invention further permits the accounting firm to securely export the financial records. The financial records exported to the client consist of the records originally imported from the client with any additions, deletions or other modifications. The financial records exported to the client are capable of being viewed and edited in the respective client-side bookkeeping software, e.g., CBS, QuickBooks, Peachtree, or Microsoft Office Accounting.

The present invention promotes accuracy and consistency when transmitting financial records and other data bi-directionally between the client systems and the accounting firm system, allows modifications to the financial records, and avoids the accounting firm from re-entering all client financial data.

In one embodiment, the present invention provides an accounting software application having an interface adapted to communicate with an external accounting software application. The interface includes a means for importing a first set of accounting information from the external application to the accounting software application; and a means for exporting a second set of accounting information from the accounting software application to the external application. In addition, the second set of accounting information is related to the first set of accounting information and the external application is from a group consisting of QuickBooks, Peachtree, Microsoft Office Accounting, Paychex, and BusinessWorks. The interface may further include a means for importing a third set of accounting information from a second external application to the accounting software application; and a means for exporting a fourth set of accounting information from the accounting software application to the second external application. In addition, the first set of accounting information may be used to generate one or more of the following: bank reconciliation, tax return, financial statement, and payroll report. In addition, the means for importing a first set of accounting information may include means for automatically translating the first set of accounting information from an external format to a format adapted for use by the accounting software application.

In another embodiment, the invention provides a method of communicating accounting data between an accounting system utilizing an accounting system software and a plurality of client systems utilizing external bookkeeping applications and data having an external format. The method includes receiving by an accounting system a first set of accounting information from a client system, the information being in an external format; translating the first set of accounting information from the external format into a format adapted for use by the accounting system software; and exporting a second set of accounting information from the accounting system to the client system, the second set of accounting information being adapted for use by an external bookkeeping application operated at the client system. In the method, the second set of accounting information is related to the first set of accounting information. Further, the external application is from a group consisting of QuickBooks, Peachtree, Microsoft Office Accounting, Paychex, and BusinessWorks. The method may further comprise: receiving a third set of accounting information from a second client system, the information being in a second external format; translating the third set of accounting information from the second external format into the format adapted for use by the accounting system software; and exporting a fourth set of accounting information from the accounting system to the second client system, the fourth set of accounting information being adapted for use by the second external application operated at the second client system. The first set of accounting information may be used to generate one or more of the following: bank reconciliation, tax return, financial statement, and payroll report.

In yet another embodiment, the invention provides an computer program for performing accounting related functions and including an interface for communicating accounting data between an accounting system and a plurality of client systems, the client systems utilizing external bookkeeping applications and having data in an external format, the computer program being embodied in a computer-readable medium and configured for execution on a computer having an associated memory, display, and input device. The computer program includes: a transfer code set adapted to receive accounting information from a client system, the information being in an external format; and a translation code set adapted to translate the accounting information received from the client system into a revised format adapted for processing by the computer program, and further adapted to retranslate the processed accounting information into the external format; and the transfer code set being further adapted to export the retranslated accounting information to the client system for use by the external bookkeeping application operated at the client system. The external bookkeeping application is from a group consisting of QuickBooks, Peachtree, Microsoft Office Accounting, Paychex, and BusinessWorks. The transfer code set may be adapted to receive a second set of accounting information from a second client system, the information being in a second external format, and the translation code set is adapted to translate the second set of accounting information from the second external format into the revised format for processing by the computer program and to retranslate the processed second set of accounting information into the second external format, the transfer code set adapted to export the retranslated second set of accounting information to the second client system for use by the second external application operated at the second client system. Also, at least some of the code executed by the computer is Internet-based or Internet-enabled or is executed on a desktop application. The data transfer code set may be further adapted to permit a user at the client system to access received accounting information.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 5 is a screen shot representing a utility for use at the accounting system to interface with the client system used by the accountant to import and export data records to the accounting firm.

DETAILED DESCRIPTION OF THE PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
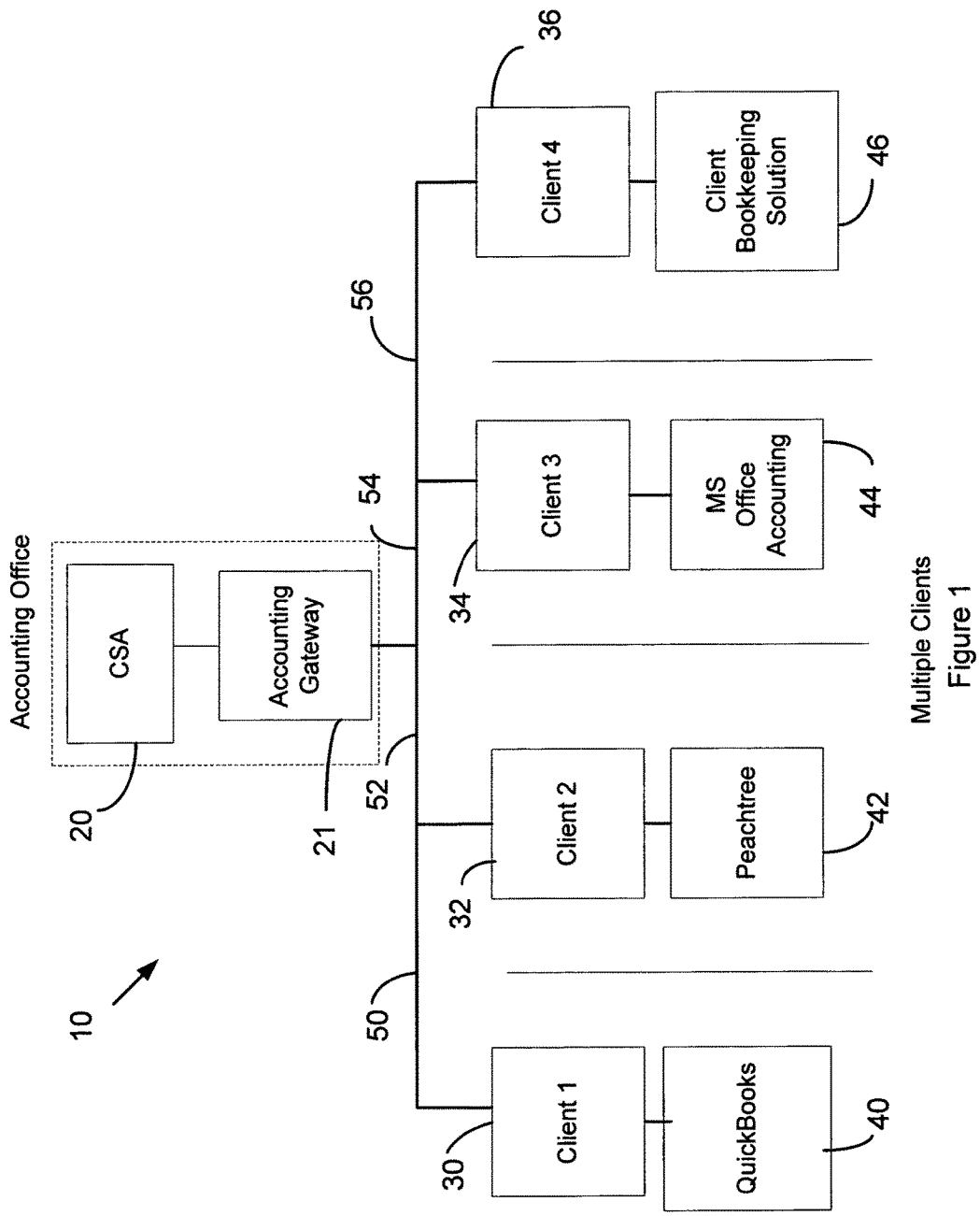
FIG. 1 is a schematic representation of an exemplary embodiment of a system architecture for interfacing and data transfer between an accounting system and a plurality of client systems in accordance with the present invention.

Referring now to FIG. 1, an accounting software architecture 10 comprises an accounting side computer system and application (CSA) 20 that is adapted to communicate via communication links 50-56 with a plurality of client-side computer-based systems 30-36 operating client bookkeeping solutions 40-46. The accounting system 20 represents a system maintained by a professional services provider, such as an accounting firm, and includes an accounting gateway or interface 21 through which data is communicated in a bi-directional manner to and from the client systems 30-36, which represent companies or entities that are clients of the accounting firm and to whom services are rendered. The computer systems typically include an output display, an input device, a central processing unit ("CPU"), an operating system, and software applications that may include a graphical user interface. The network connections may be one or more of an intranet, Internet, WLAN, or other wired and/or wireless connection.

The accounting software architecture 10 of FIG. 1 allows for a user of the accounting system 20 to securely import and export financial records and other client and firm data ("accounting information") to and from client systems 30-36. Accounting gateway or interface 21 receives and translates data to provide a seamless bi-directional flow of data between the CSA 20 and the client systems 30-36. To this end, the gateway 21 formats and reformats data and data records across multiple external formats to permit software executed at the CSA 20 and various software applications running at the client systems to automatically process the data and data records. For instance, client systems 30-36 may be used to execute and operate various bookkeeping solutions such as QuickBooks Pro®/Premier/Enterprise "QuickBooks" 40, Peachtree® 42, MS Office Accounting® 44, and Thomson's Client Bookkeeping Solution (CBS) 46, as well as others such as Paychex, and BusinessWorks® formats. The data and data records, including financial records are respectively maintained in applications 40-46. In one embodiment, the accounting system 20 automatically encrypts all data being exported to the client systems using a known encryption technique.

Figure 2:
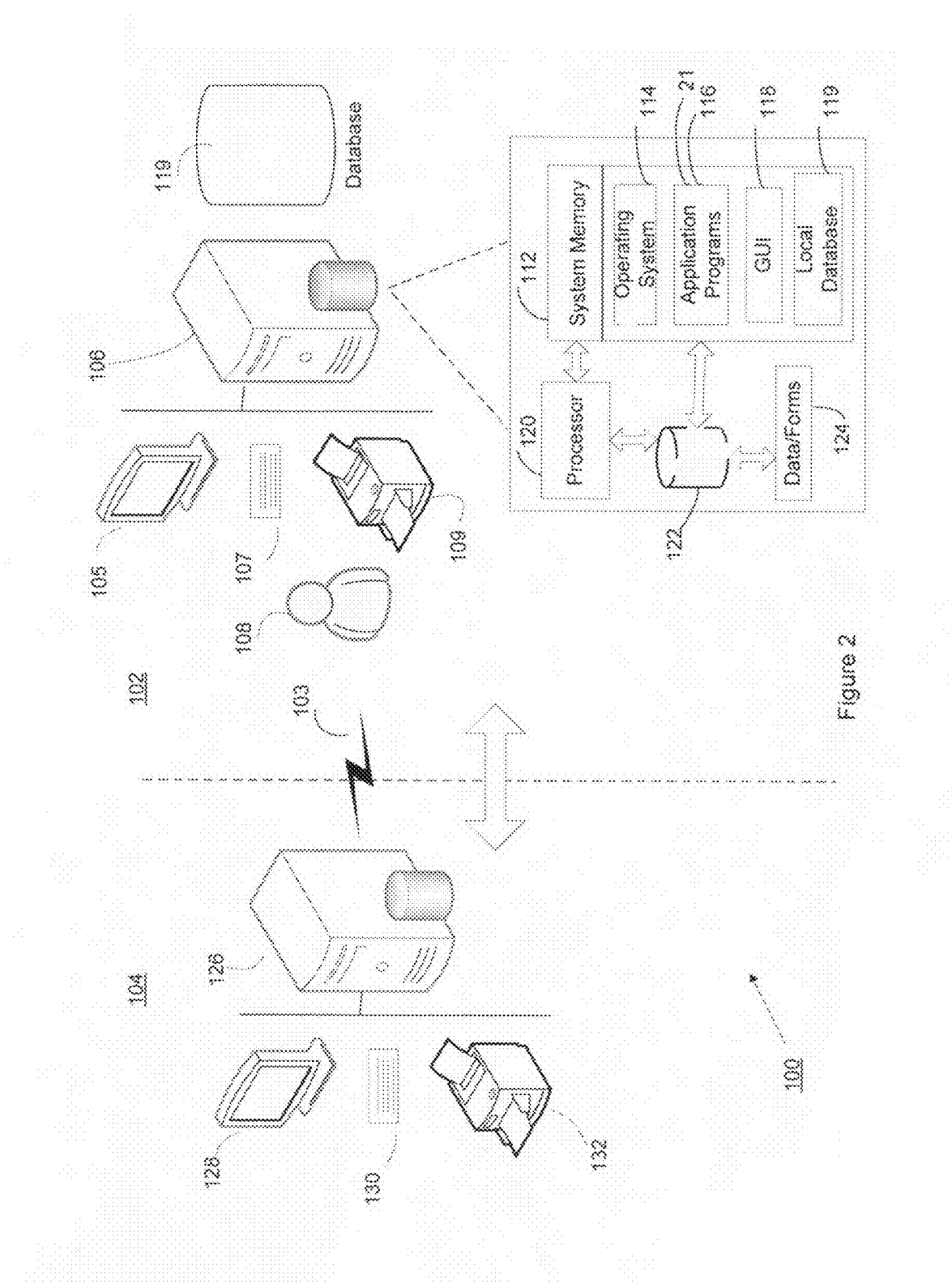
FIG. 2 is a schematic showing a more detailed representation of the exemplary embodiment.

Referring now to FIG. 2, a client/service provider communication system 100 is shown for implementing the accountant gateway and associated software that provides an effective bi-directional flow of client data and financial records to/from accounting provider system 102 and client system 104. The accountant gateway may be an application 21, such as one of the application programs 116, available to or stored on the computer 106. The system 100 includes a central accounting side 102, and a remote client-side system 104. In this example, a user 108, such as a professional preparing a financial statement, may operate at the accounting provider system 102 to establish a communication link 103 with the client system 104. This configuration is one of many and is not limiting as to the invention. For example, in one alternative configuration user 108 may use the application fully self-contained within a desktop or server or network environment, and may utilize a local database 119, such as SQL 2005 or above or SQL Express or other suitable database, to store client data and records. Any of several suitable communication links 103 are available, such as one or a combination of wireless, LAN, WLAN, ISDN, X.25, DSL, and ATM type networks, for example. The communication link 103 is preferably secure such as by using encryption techniques. The accounting system computer 106 may comprise a typical combination of hardware and software including system memory 112, operating system 114, application programs 116, graphical user interface (GUI) 118, processor 120, and storage 122 which may contain electronic information 124 such as data records, transactions, data, procedures and the like. The operating system 114 should be suitable for use with the accountant gateway functionality described herein, for example, Microsoft Windows Vista (business, enterprise and ultimate editions), or Windows XP Professional with SP2. Also, the accountant gateway invention may be browser-based and/or may include custom integration with Microsoft Office applications, e.g., Outlook, Word and Excel. Application programs 116 may include, for example, Microsoft Office 2007, Office XP with SP2, or Office 2003 with SP1 applications. The software and related data used to implement the accountant gateway processes may be accessed by the machine 106 via the Internet or it may be loaded onto the machine via CD-ROM or other media or a combination of such means. The system requirements in one embodiment may require the machine 106 to be compatible with minimum threshold levels of processing capabilities, e.g., Intel Pentium III, speed, e.g., 500 MHz, and other parameters.

For purposes of discussion, an exemplary client system 104 may comprise a computer and database 126, user interface peripherals such as drives (not shown), monitor 128, keyboard 130, and printer 132. The client system computer and database 126 may be used to communicate remotely with the accounting system 102 and may load, pass, receive information and instructions, such as software executable on the machine 126 and data, forms, procedures and the like for storing and using locally by a user. A communication link 103 may be established between the accounting system 102 and the client system 104 for updating data and software used by the user during accounting related processes. The accounting system 102 may also include one or more application servers and other devices to help facilitate the exchange of software and data between the user 108 and a plurality of client systems. The accounting system 102 may be associated with a professional services company, such as an accounting firm, in the business of preparing financial statements and providing other financial related services.

The client system 104 may include a network of computers, such as over a LAN, WLAN, Ethernet, token ring, FDDI ring or other communications network infrastructure. The client facility may also include a database or other data storage component. Aspects of the system 100 may be enabled using any combination of Internet or (World Wide) WEB-based, desktop-based, or application WEB-enabled.

Figure 3:
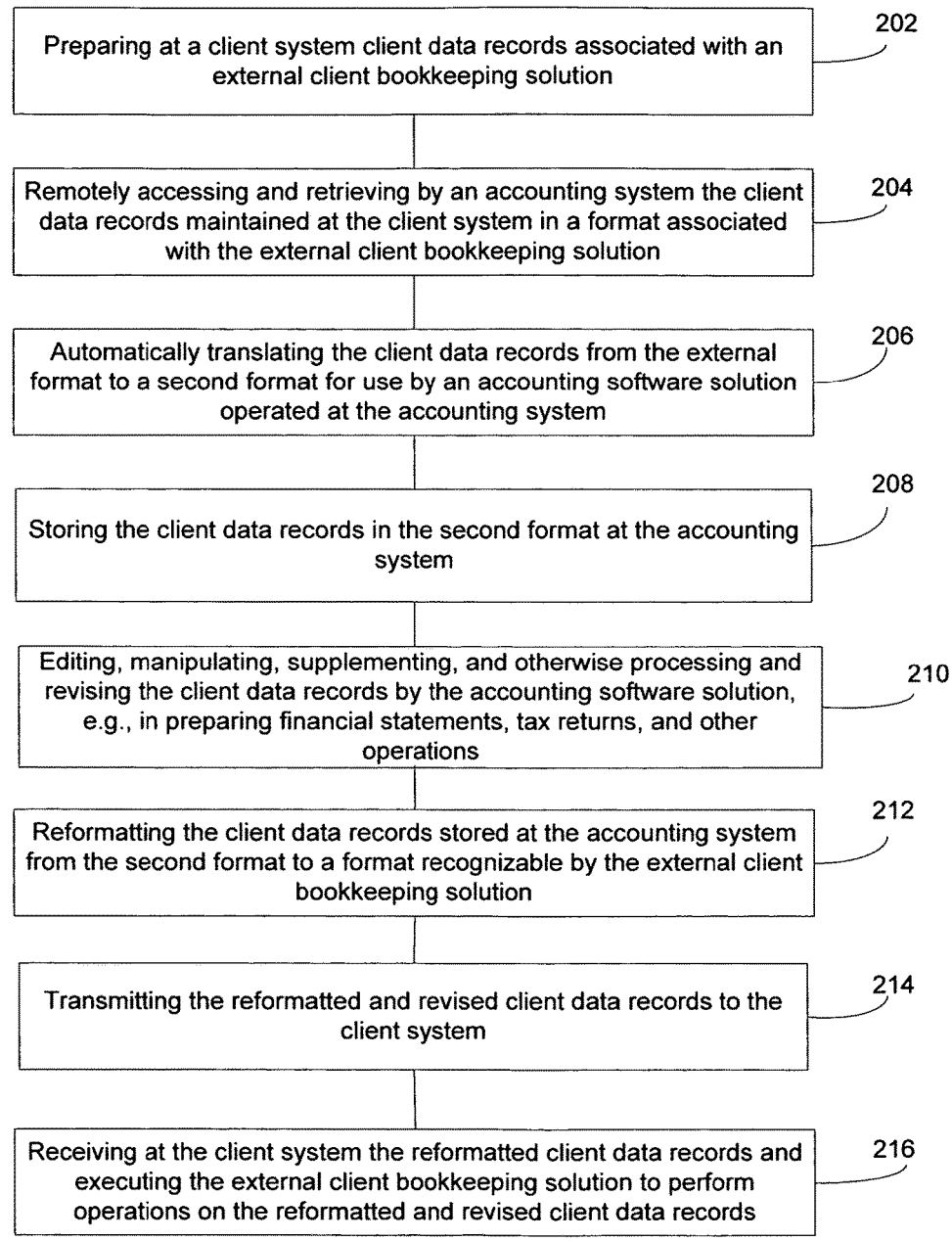
FIG. 3 is a flow chart of an exemplary data exchange using the accounting gateway component of the present invention.

Referring now to FIG. 3, a flowchart is shown illustrating an exemplary process 200 incorporating the translation and formatting capabilities of the accounting gateway aspect of the invention. At step 202, client data records associated with an external client bookkeeping solution are prepared, generated, and/or stored at a client system. At step 204, the accounting system remotely accesses and retrieves the client data records maintained at the client system. The client data records are in a format associated with the external client bookkeeping solution. In the alternative, a client-side utility may be used at the client system to upload or "push" client data via removable media, email attachment, or otherwise deliver the data to the accounting system. At step 206, the accounting gateway component of the accounting system automatically translates the client data records from the external format to a second format for use by the accounting software solution operated at the accounting system. At step 208, the client data records are stored in the second format at the accounting system. At step 210, the client data records are edited, manipulated, supplemented, and otherwise processed and revised by the accounting software solution, e.g., in preparing financial statements, tax returns, and other operations. At step 212, the client data records stored at the accounting system are reformatted from the second format to a format recognizable by the external client bookkeeping solution, e.g., formatted back into the original external bookkeeping solution format or an alternative format recognizable by such system. At step 214, the reformatted and revised client data records are transmitted to the client system. And at step 216, the client system receives the reformatted client data records and executes the external client bookkeeping solution to perform operations on the reformatted and revised client data records. Using this operation, a service provider may efficiently and effectively access, view, edit and return financial records maintained at multiple client systems and maintained in multiple external formats.

In one scenario, the client data may be imported from a data backup at the client system. In addition, the accounting system may maintain a backup copy of the imported client data records.

The accounting software system and gateway application of the present invention permits the accounting service provider to securely export client data records, such as financial records, from the accounting system 102 to the client system 104. The accounting software application may automatically encrypt all data being exported. Any method of known encryption may be used to implement the present invention. The client data records may be exported to the client system for a variety of reasons including review, approval and record-keeping by the client. The accounting gateway component may also involve a client-side module or code set stored and operated at the client system. The client may view and edit the client data record locally using, respectively, the onsite client bookkeeping solution, e.g., QuickBooks, Peachtree, Thomson's Client Bookkeeping Solution, or Microsoft Office Accounting. The accounting service provider and client may receive the data records via e-mail, via a portal connection, wired connections or through removable media.

Figure 4:
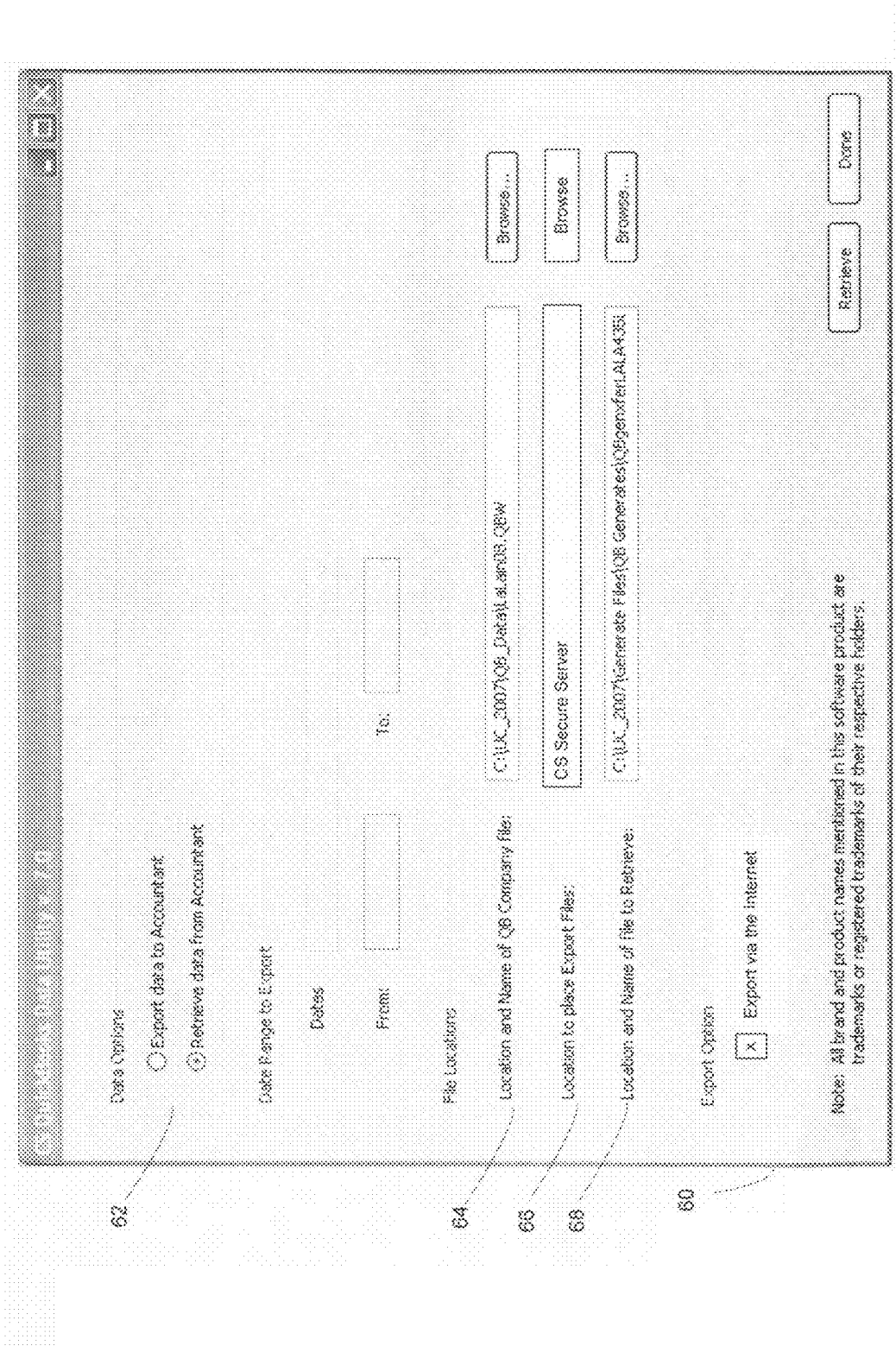
FIG. 4 is a screen shot representing a utility for use at the client system to interface with the accounting software application used by the client to import and export data records to the accounting firm.

FIG. 4 depicts an exemplary screen associated with an interface used by the Client in association with the accounting gateway. The screen shot represents a utility used by the client to export data out of or import data into the external bookkeeping solution, in this example QuickBooks, and shows how the adjusting transactions are retrieved into either program. From the interface 60, shown as a QuickBooks Utility interface screen shot, the client can determine at data options selection toggle 62 whether they wish to export data to or import or retrieve data from the accounting service provider system. Further, interface screen 60 provides a field from which the client can determine, browse for, define or edit the location and name 64 of the file to be imported into or exported from, the location 66 where the file will be exported, and the location and name 68 where the file will be retrieved or imported.

Figure 5:
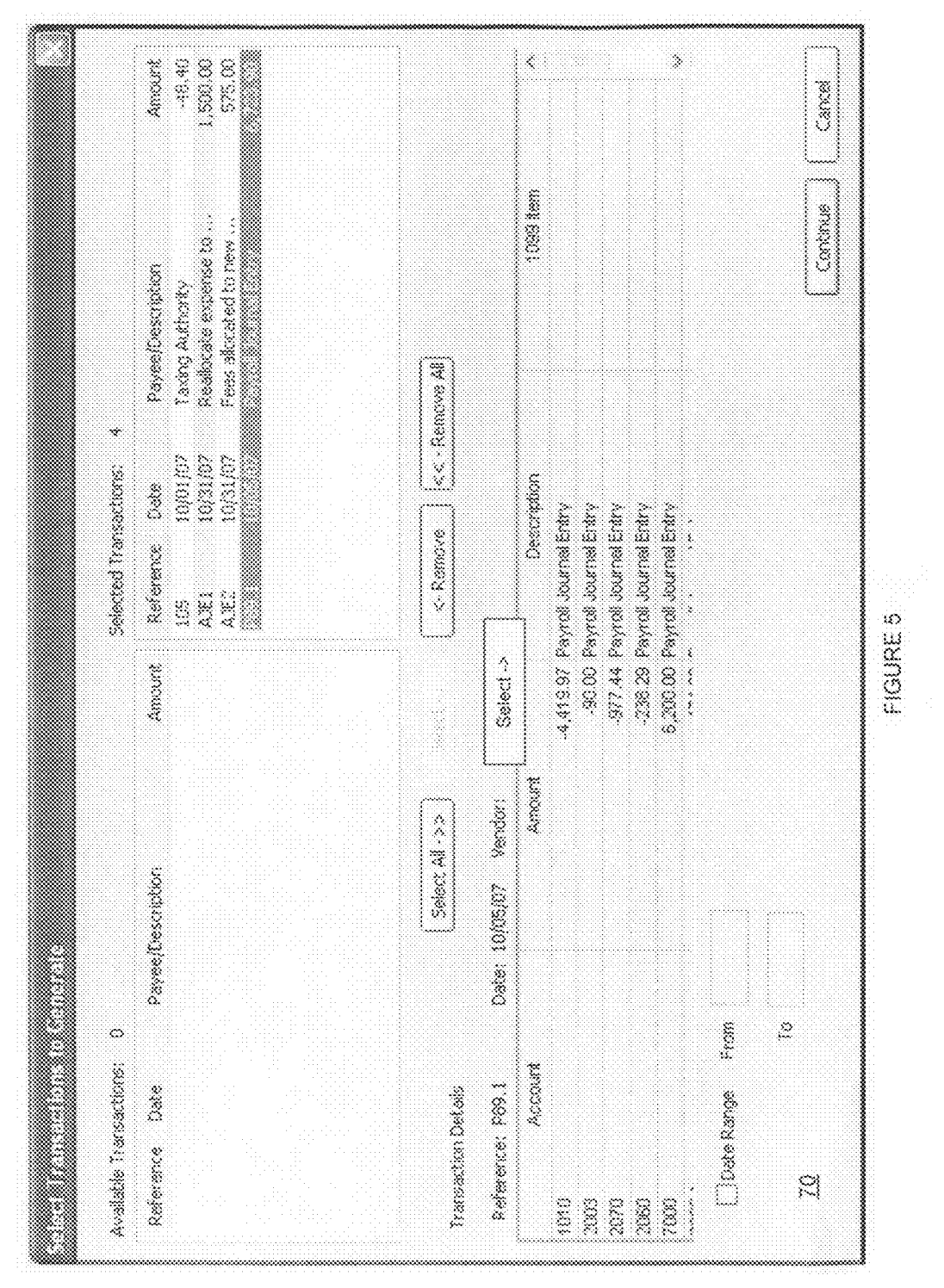

FIG. 5 depicts an exemplary screen shot 70 associated with the accounting gateway and shows a dialog that appears to the user, such as a financial services provider, when exporting data from the accountant's system to the client system. Using this utility, the user has the ability to view financial and other data records that are available for export to the client system. The user may view specific details of each financial or data record, including a description, the accounts, and the amounts of entry.

In a preferred embodiment, and referring to FIG. 1, the accounting software application 20 and accounting gateway 21 are capable of importing and translating data records from a plurality of client systems 30-36. In this embodiment, the accounting system 20 imports four sets of client data records respectively from client systems 30-36 with each set being in a different format for each of the four client bookkeeping solutions 40-46, i.e., application 40 QuickBooks, application 42 Peachtree, application 44 Microsoft Office Accounting; and application 46 Thomson CBS.

The accounting software architecture 10 of FIG. 1 may also include a secure aspect whereby data records are securely imported and exported between the client and accountant systems. For example, the accounting software application 20 may automatically encrypt all data being exported. Any method of known encryption may be used to implement the present invention. Also, the systems may be set up to determine read and write privileges on both side of the data exchange based on some form of authorization or granting process as is well known.

In an alternative embodiment the accounting software application 20 may initially create a backup or copy of the client data set and preserve the original. In one exemplary manner, the accounting software application 20 creates a copy by reading data out of the original data set using the native API of the program used in association with the external bookkeeping solution. The accounting software application 20 then takes the data read out of the API and creates a new, second set of data for being edited and otherwise processed.

Figure 6:
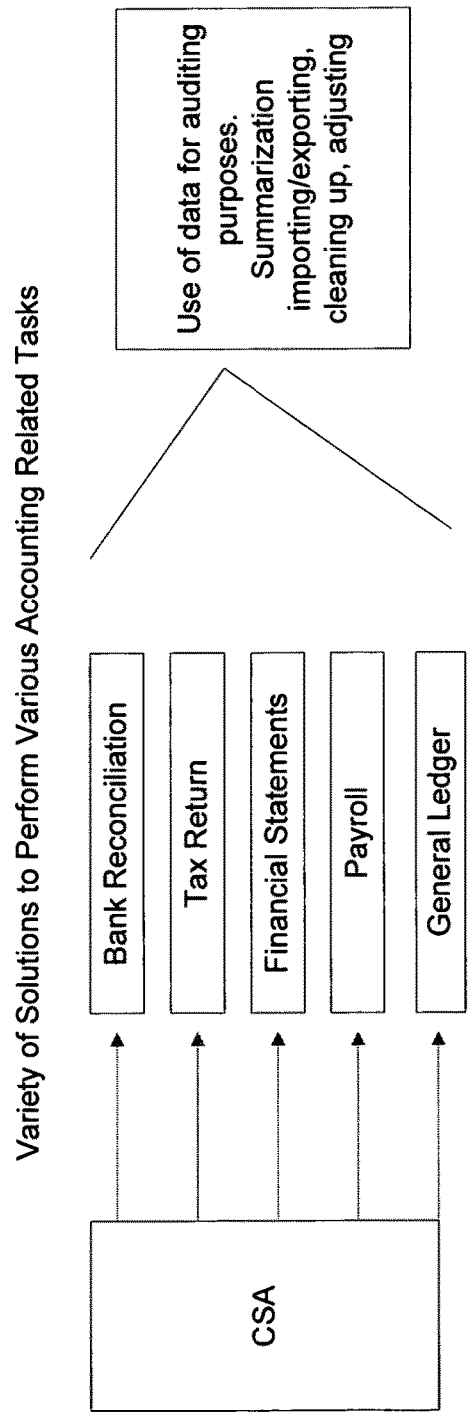
FIG. 6 is a schematic representation of exemplary transactions generated by the accounting system.

Referring now to FIG. 6, the accounting software application 20 may use the client data records to generate transactions such as, for example, a bank reconciliation, a tax return, a financial statement, a payroll report, and general ledger.

In a preferred embodiment, the accounting software application 20 and/or the client bookkeeping application may be implemented by being installed on a single Application Service Provider (ASP) host. A secure, direct connection may be established between the accounting system and the client systems.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. An accounting software application for delivering professional services over a communications network and having a computer-implemented interface adapted to communicate with an external client accounting software application, the interface comprising:

means for establishing an encrypted, bi-directional network gateway for the communications network between a remote client system and a local provider system;

means for importing a first financial data set associated with a client from the remote client system executing the external client accounting software application to the accounting software application, the first financial data set being in an external format and associated with the external client accounting software application;

means for translating the first financial data set from the external format into a format adapted for use by the accounting software application and generating a translated first financial data set;

means for determining accuracy of data in the translated first financial data set and automatically generating a revised first financial data set upon detecting errors in the translated first financial data set;

means for processing by a computer the translated first financial data set and generating a second financial data set based at least in part on a set of data in the translated first financial data set and, in the event of errors detected in the translated first financial data set, at least in part on the revised first financial data set, wherein the second financial data set may be a structured data record representing a financial statement associated with the client; and means for exporting the second financial data set from the accounting software application to the remote client system executing the external client accounting software application, the second financial data set adapted for use by the external client accounting software application, and including data representing the revised first financial data set in the event of detected errors in the translated first financial data set.

2. The accounting software application of claim 1 wherein the second financial data set is related to the first financial data set.

3. The accounting software application of claim 1 wherein the interface further comprises:

means for importing a third financial data set from a second remote client system operating a second external client accounting software application to the accounting software application, the third financial data set being in a second external format associated with the second external client accounting software application;

means for translating the third financial data set from the second external format into the format adapted for use by the accounting system software;

means for determining the accuracy of data in the translated third financial data set and automatically generating a revised third financial data set upon detecting errors in the translated third financial data set;

means for generating by the accounting system software a fourth financial data set based at least in part on a set of data in the translated third financial data set and, in the event of errors detected in the translated third financial data set, at least in part on the revised third financial data set, wherein the fourth financial data set may be a structured data record representing a financial statement associated with the second client; and means for exporting the fourth financial data set from the accounting software application to the second remote client system operating the second external client accounting software application.

4. The accounting software application of claim 1 wherein the means for processing processes the translated first financial data set to generate a structured data record representing at least one of the following: bank reconciliation, tax return, financial statement, and payroll report.

5. The accounting software application of claim 1 wherein the means for importing a first financial data set includes means for automatically translating the first financial data set from an external format to a format adapted for use by the accounting software application.

6. A method of communicating accounting data over a communications network between an accounting system utilizing an accounting system software associated with delivery of professional services and a plurality of remote client systems utilizing external client accounting software applications and data having an external format, the method comprising:

establishing by the accounting system an encrypted, bi-directional network gateway for the communications network between a remote client system and the accounting system;

electronically receiving by the accounting system a first financial data set associated with a client from the remote client system for processing by accounting system software operating on the accounting system, the first financial data set being in an external format associated with a client accounting software application operating on the remote client system;

translating the first financial data set from the external format into a format adapted for use by the accounting system software and generating a translated first financial data set;

determining the accuracy of data in the translated first financial data set and automatically generating a revised first financial data set upon detecting errors in the translated first financial data set;

generating by the accounting system software a second financial data set based at least in part on a set of data in the translated first financial data set and, in the event of errors detected in the translated first financial data set, at least in part on the revised first financial data set, wherein the second financial data set may be a structured data record representing a financial statement associated with the client; and exporting the second financial data set from the accounting system to the remote client system, the second financial data set comprising data derived from the translated first financial data set and being adapted for use by the client accounting software operated at the remote client system, the second financial data set further comprising data representing the revised first financial data set in the event of detected errors in the translated first financial data set.

7. The method of claim 6 wherein the second financial data set is related to the first financial data set.

8. The method of claim 6 further comprising:

electronically receiving by the accounting system a third financial data set from a second remote client system, the third financial data set being in a second external format associated with a second external client accounting software application operating on the second remote client system;

translating the third financial data set from the second external format into the format adapted for use by the accounting system software;

determining the accuracy of data in the translated third financial data set and automatically generating a revised third financial data set upon detecting errors in the translated third financial data set;

generating by the accounting system software a fourth financial data set based at least in part on a set of data in the translated third financial data set and, in the event of errors detected in the translated third financial data set, at least in part on the revised third financial data set, wherein the fourth financial data set may be a structured data record representing a financial statement associated with the second client; and exporting the fourth financial data set from the accounting system to the second client system, the fourth financial data set being adapted for use by the second external client application operated at the second client accounting software system.

9. The method of claim 6 wherein the translated first financial data set is used to generate a structured data record representing at least one of the following: bank reconciliation, tax return, financial statement, and payroll report.

10. A computer program for performing accounting related functions and including an interface for communicating accounting data between an accounting system and a plurality of remote client systems via a communications network, each client system utilizing an external client accounting software application and having financial data in an external format, the computer program being embodied in a computer-readable medium and configured for execution on a computer having an associated memory, display, and input device, the computer program comprising:

a gateway set of code adapted to establish an encrypted, bi-directional gateway for the interface over the communications network between a remote client system from the plurality of remote client systems and the accounting system;

a transfer code set adapted to receive financial data particular to a client from the remote client system for processing by the accounting system, the financial data being in an external format associated with an external client accounting software application operating on the remote client system;

a translation code set adapted to translate the received financial data received from the remote client system in the external format into a translated format, generating translated financial data adapted for processing by the computer program on the accounting system in performing a set of accounting related functions;

a determination code set adapted to determine the accuracy of data in the translated financial data and automatically generate revised financial data upon detecting errors in the translated financial data;

a processing code set adapted to generate a data record representing a financial statement particular to the client based at least in part on the translated financial data and, in the event of errors detected in the translated financial data, at least in part on the revised financial data; and the transfer code set being further adapted to export the data record to the remote client system for use by the external client accounting software application operated at the remote client system, the data record including data representing the revised financial data in the event of detected errors in the translated financial data.

11. The computer program of claim 10 wherein the transfer code set is adapted to receive a second financial data set from a second client system, the second financial data set being in a second external format associated with a second external application, and the translation code set is adapted to translate the second financial data set from the second external format into the translated format for processing by the computer program, the determination code set adapted to determine the accuracy of data in the translated second financial data set and automatically generate a revised second financial data set upon detecting errors in the translated second financial data set, the processing code set adapted to generate a second data record representing a financial statement particular to the second client based at least in part on the translated second financial data set and, in the event of errors detected in the translated second financial data set, at least in part on the revised second financial data set, the transfer code set adapted to export the second data record to the second client system for use by the second external application operated at the second client system.

12. The computer program of claim 10 wherein at least some of the code executed by the computer is Internet-based or Internet-enabled.

13. The computer program of claim 10 wherein at least some of the code executed by the computer is a desktop application.

14. The computer program of claim 10 wherein the data transfer code set is further adapted to permit a user at the client system to access received accounting information.

15. An accounting software application for delivering professional services over a communications network and having a computer-implemented interface adapted to communicate with a remote client system operating an external client accounting software application, the interface comprising:
    means for establishing an encrypted, bi-directional gateway in the communications network between the remote client system and a local provider system;
    means for importing a first financial data set associated with the remote client from the remote client system operating the external client application to the accounting software application, the first financial data set being in an external format and associated with the external client accounting software application;
    means for translating the first financial data set from the external format into a format adapted for use by the accounting software application and generating a translated first financial data set;
    means for determining accuracy of data in the translated first financial data set and automatically generating a revised first financial data set upon detecting errors in the translated first financial data set;
    means for processing by a computer the translated first financial data set and generating a data record representing a tax return particular to the client and based at least in part on a set of data in the translated first financial data set and, in the event of errors detected in the translated first financial data set, at least in part on the revised first financial data set; and
    means for exporting a second financial data set from the accounting software application to the remote client system operating the external client accounting software application representing the data record, and including data representing the revised first financial data set in the event of detected errors in the translated first financial data set.

16. The accounting software application of claim 15 wherein the data record representing a tax return is one of a group consisting of: payroll tax return, income tax return, use tax return, sales tax return, and property tax return.

17. The accounting software application of claim 15 wherein the second financial data set differs from the first financial data set.

18. A method of communicating accounting data between an accounting system utilizing an accounting system software associated with delivery of professional services via a communications network and a plurality of remote client systems utilizing external client accounting software applications and data having an external format, the method comprising:
    establishing by an accounting system an encrypted, bi-directional gateway in the communications network between a remote client system in the plurality of remote client systems and the accounting system;
    receiving by the accounting system a first financial data set associated with a client from the remote client system for processing by accounting system software operating on the accounting system, the first financial data set being in an external format associated with the external client accounting software application operating on the remote client system;
    translating the first financial data set from the external format into a format adapted for use by the accounting system software and generating a translated first financial data set;
    determining the accuracy of data in the translated first financial data set and automatically generating a revised first financial data set upon detecting errors in the translated first financial data set;
    generating by the accounting system software a data record representing a tax return particular to the client and based at least in part on a set of data in the translated first financial data set and in the event of errors detected in the translated first financial data set at least in part on the revised first financial data set; and
    exporting a second financial data set from the accounting system to the remote client system, the second financial data set representing the data record and comprising data derived from the translated first financial data set and including data representing the revised first financial data set in the event of detected errors in the translated first financial data set.

19. The method of claim 18 wherein the data record representing a tax return is one of a group consisting of: payroll tax return, income tax return, use tax return, sales tax return, and property tax return.

20. The method of claim 18 wherein the second financial data set differs from the first financial data set.

21. A computer program for performing accounting related functions and including an interface for communicating accounting data between an accounting system and a plurality of remote client systems over a communications network, each remote client systems utilizing external client accounting software applications and having financial data in an external format, the computer program being embodied in a computer-readable medium and configured for execution on a computer having an associated memory, display, and input device, the computer program comprising:
    a gateway set of code adapted to establish an encrypted, bi-directional gateway for the interface over the communications network between a remote client system from the plurality of remote client systems and the accounting system;
    a transfer code set adapted to receive financial data particular to a client from the remote client system for processing by the accounting system, the information being in an external format associated with an external client accounting software application;
    a translation code set adapted to translate the financial data received from the remote client system into a translated format resulting in translated financial data adapted for processing by the computer program on the accounting system in performing a set of accounting related functions;
    a determination code set adapted to determine the accuracy of data in the translated financial data and generating revised financial data upon detecting errors in the translated financial data;
    a processing code set adapted to generate a data record representing a tax return particular to the client based at least in part on the translated financial data received and, in the event of errors detected in the translated financial data, at least in part on the revised financial data; and the transfer code set being further adapted to export the data record to the client system for use by the remote client system operating the external client accounting software application, the data record including data representing the revised financial data in the event of detected errors in the translated financial data.

22. The computer program of claim 21 wherein the data record representing a tax return is one of a group consisting of: payroll tax return, income tax return, use tax return, sales tax return, and property tax return.

23. The computer program of claim 21 wherein the revised financial data differs from the financial data received.

24. The accounting software application of claim 1, further comprising means for graphically displaying information relating to the accounting software application.

25. The accounting software application of claim 1, wherein the financial statement is one of a group consisting of: balance sheet, payroll information report, accounting report, bank reconciliation report, and income statement.

26. The method of claim 6, further comprising the step displaying information graphically, wherein the information relates to the method of communicating the accounting data.

27. The method of claim 6, wherein the financial statement is one of a group consisting of: balance sheet, payroll information report, accounting report, bank reconciliation report, and income statement.

28. The computer program of claim 10, further comprising a display code set being adapted to display information relating to the computer program.

29. The computer program of claim 10, wherein the financial statement is one of a group consisting of: balance sheet, payroll information report, accounting report, bank reconciliation report, and income statement.

30. The computer program of claim 10 wherein the processing code set processes the first financial data set to generate at least one of the following: bank reconciliation, tax return, financial statement, and payroll report.

* * * * *